US012701636B2

(12) United States Patent
Niemi

(10) Patent No.:     US 12,701,636 B2
(45) Date of Patent:         Aug. 4, 2026

(54) HANDLING OF NAS TIMERS DURING UNAVAILABILITY PERIOD

(71) Applicant: MediaTek Singapore Pte. Ltd., Singapore (SG)

(72) Inventor: Marko Niemi, Oulu (FI)

(73) Assignee: MediaTek Singapore Pte. Ltd., Singapore (SG)

( * ) Notice: Subject to any disclaimer, the term of this patent is extended or adjusted under 35 U.S.C. 154(b) by 222 days.

(21) Appl. No.: 18/520,677

(22) Filed: Nov. 28, 2023

(65) Prior Publication Data

US 2024/0188184 A1     Jun. 6, 2024

Related U.S. Application Data

(60) Provisional application No. 63/385,635, filed on Dec. 1, 2022.

(51) Int. Cl.
| *H04W 76/38* | (2018.01) |
| *H04W 60/04* | (2009.01) |
| *H04W 60/06* | (2009.01) |

(52) U.S. Cl.
CPC ........... *H04W 76/38* (2018.02); *H04W 60/04* (2013.01); *H04W 60/06* (2013.01)

(58) Field of Classification Search
None
See application file for complete search history.

(56) References Cited

U.S. PATENT DOCUMENTS

| 12,389,361 B1 | 8/2025 | Yu |
| 12,426,001 B1 | 9/2025 | Yu |

| 2023/0012328 A1* | 1/2023 | Kumar | .................. H04W 76/25 |
| 2023/0254803 A1 | 8/2023 | Lu et al. | |
| 2023/0362704 A1 | 11/2023 | Edge et al. | |
| 2024/0298164 A1* | 9/2024 | Höglund | ............. H04W 36/322 |

(Continued)

FOREIGN PATENT DOCUMENTS

| EP | 4546940 A1 * | 4/2025 | ............ H04W 76/25 |
| EP | 4550892 A1 | 5/2025 | |

(Continued)

OTHER PUBLICATIONS

Taiwan Patent Office "Office Action" Aug. 9, 2024, Taiwan.

(Continued)

*Primary Examiner* — Hong S Cho

(74) *Attorney, Agent, or Firm* — Troutman Pepper Locke LLP; Tim Tingkang Xia, Esq.

(57)     ABSTRACT

In an aspect of the disclosure, a method, a computer-readable medium, and an apparatus are provided. The method may be performed by a UE. In certain configurations, the UE activates an unavailability period. The UE stops one or more first non-access stratum (NAS) timers and allows one or more second NAS timers to run when the unavailability period is activated. The unavailability period may be activated by transmitting, to a network, a request message for initiating a procedure and indicating the unavailability period. The procedure may be an initial registration procedure, an attach procedure, a tracking area updating procedure or a mobility registration update procedure. Alternatively, the procedure may be a UE-initiated deregistration procedure or a UE-initiated detach procedure.

18 Claims, 15 Drawing Sheets

(56) References Cited

U.S. PATENT DOCUMENTS

| | | | |
|---|---|---|---|
| 2024/0324010 A1 | 9/2024 | Puneet | |
| 2024/0381207 A1 | 11/2024 | Puneet et al. | |
| 2025/0212152 A1* | 6/2025 | Gupta | H04W 60/00 |

FOREIGN PATENT DOCUMENTS

| | | |
|---|---|---|
| EP | 4572414 A1 | 6/2025 |
| WO | 2024005429 A1 | 1/2024 |
| WO | 2024035062 A1 | 2/2024 |
| WO | 2025037851 A1 | 2/2025 |
| WO | 2025037916 A1 | 2/2025 |

OTHER PUBLICATIONS

Taiwan Patent Office "Office Action" Aug. 27, 2024, Taiwan.

3GPP TSG-CT WG1 Meeting #135-e, C1-222626, E-Meeting, Apr. 6-12, 2022.

3GPP TS 24.501 V17.2.0 (Mar. 2021), 3rd Generation Partnership Project; Technical Specification Group Core Network and Terminals; Non-Access-Stratum (NAS) protocol for 5G System (5G5); Stage 3; (Release 17).

3GPP SA WG2 Meeting #153E, S2-2209160, Oct. 10-17, 2022, Electronic meeting.

SA WG2 Meeting #157, S2-2306564, Berlin, Germany, May 22-26, 2023.

3GPP SA WG2 Meeting #153E, Oct. 10-17, 2022, Electronic meeting, S2-2209160.

3rd Generation Partnership Project; Technical Specification Group Services and System Aspects; Study on Seamless UE context recovery (Release 18), 3GPP TR 23.700-61 V18.0.0 (Jun. 2022).

3GPP TSG-CT WG1 Meeting #144 C1-237071, Xiamen, China, Oct. 9-13, 2023.

European Search Report, May 3, 2024, Germany.

SA WG2 Meeting #157, Berlin, Germany, May 22-26, 2023, S2-2306564(was S2-2204208r06), Closing ENs for the procedures for discontinuous coverage reporting.

3GPP TS 23.122 V18.0.0 (Sep. 2022), 3rd Generation Partnership Project; Technical Specification Group Core Network and Terminals; Non-Access-Stratum (NAS) functions related to Mobile Station (MS) in idle mode (Release 18).

3GPP TR 23.700-61 V18.0.0 (Jun. 2022), 3rd Generation Partnership Project; Technical Specification Group Services and System Aspects; Study on Seamless UE context recovery (Release 18).

3GPP TR 23.700-28 V0.3.0 (May 2022), 3rd Generation Partnership Project; Technical Specification Group Services and System Aspects; Study on satellite access, Phase 2 (Release 18).

3GPP SA WG2 Meeting #153E, S2-2209160, Oct. 10-17, 2022, Electronic meeting, Support of unavailability period.

European Patent Office, Dec. 4, 2025, Germany.

3GPP TS24.301 V18.0.0 (Sep. 2022), 3rd Generation Partnership Project; Technical Specification Group Core Network and Terminals; Non-Access-Stratum (NAS) protocol for Evolved Packet System (EPS) Stage 3 (Release 18). https://cloud.hoefer-pat.de/s/xTqosymoNAYJqQR.

3GPP TS 24.301 V18.0.0 (Sep. 2022), 3rd Generation Partnership Project; Technical Specification Group Core Network and Terminals; Non-Access-Stratum (NAS) protocol for Evolved Packet System (EPS); Stage 3, (Release 18).

* cited by examiner

1400

1410 — activating an unavailability period

1420 — stopping one or more first NAS timers and allowing one or more second NAS timers to run when the unavailability period is activated

1500

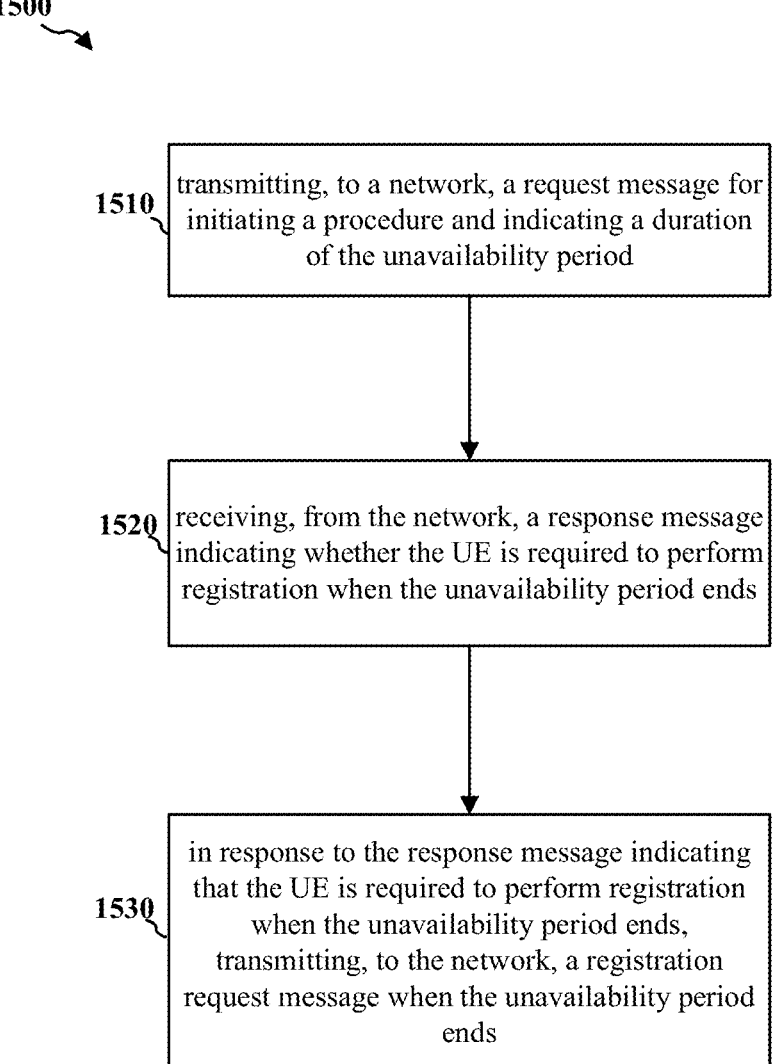

1510 transmitting, to a network, a request message for initiating a procedure and indicating a duration of the unavailability period 1520 receiving, from the network, a response message indicating whether the UE is required to perform registration when the unavailability period ends 1530 in response to the response message indicating that the UE is required to perform registration when the unavailability period ends, transmitting, to the network, a registration request message when the unavailability period ends

FIG. 15

HANDLING OF NAS TIMERS DURING UNAVAILABILITY PERIOD

CROSS-REFERENCE TO RELATED APPLICATION(S)

This application claims the benefits of U.S. Provisional Application Ser. No. 63/385,635, entitled "HANDLING OF NAS TIMERS DURING UNAVAILABILITY PERIOD" and filed on Dec. 1, 2022, which is expressly incorporated by reference herein in their entirety.

BACKGROUND

Field

The present disclosure relates generally to communication systems, and more particularly, to techniques of methods and apparatuses for handling of NAS timers during an unavailability period.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may be performed by a UE. In certain configurations, the UE activates an unavailability period. The UE stops one or more first NAS timers and allows one or more second NAS timers to run when the unavailability period is activated.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 15 is a flow chart of a method (process) of wireless communication of a UE.

DETAILED DESCRIPTION

Figure 1:
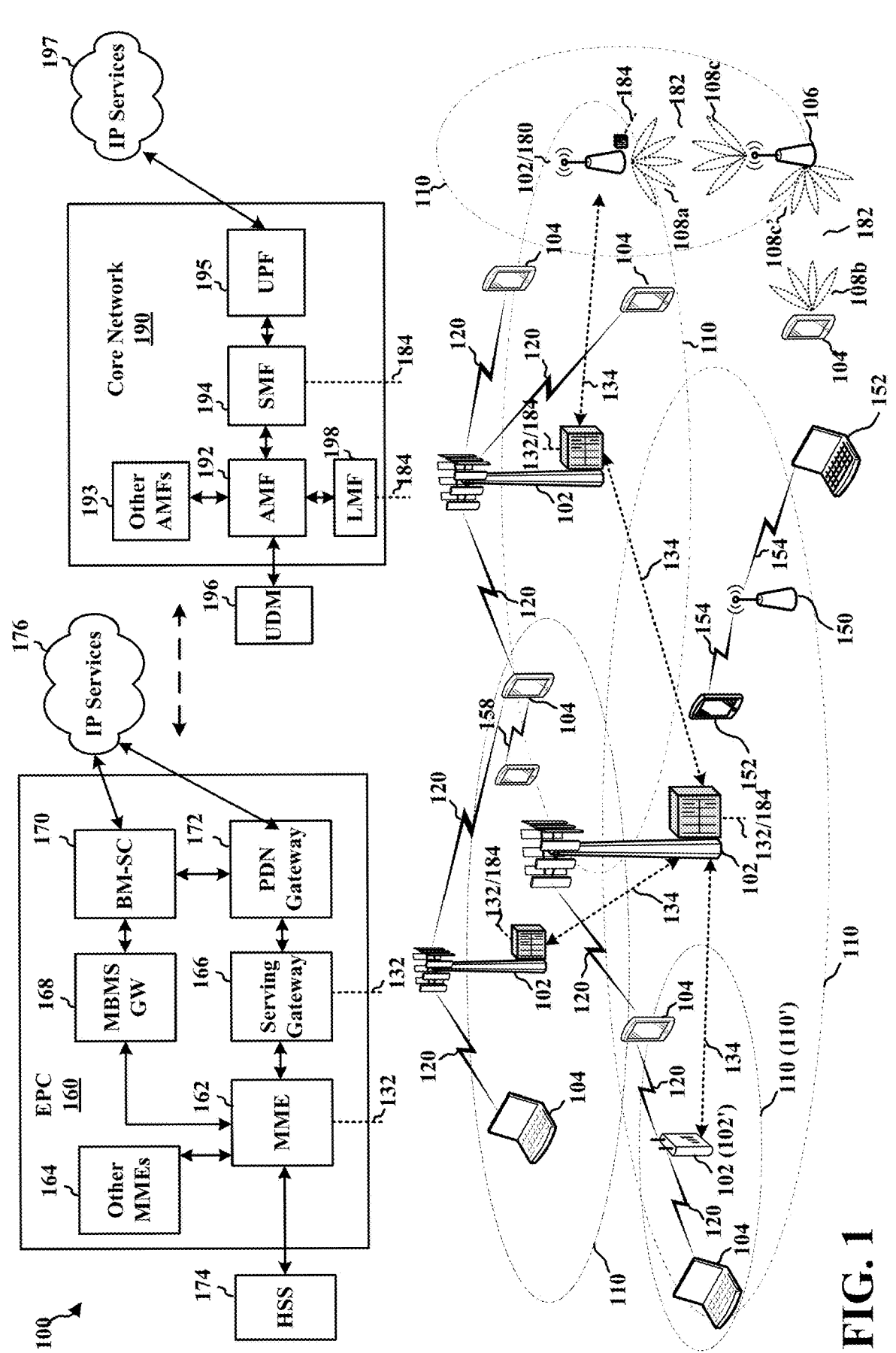
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
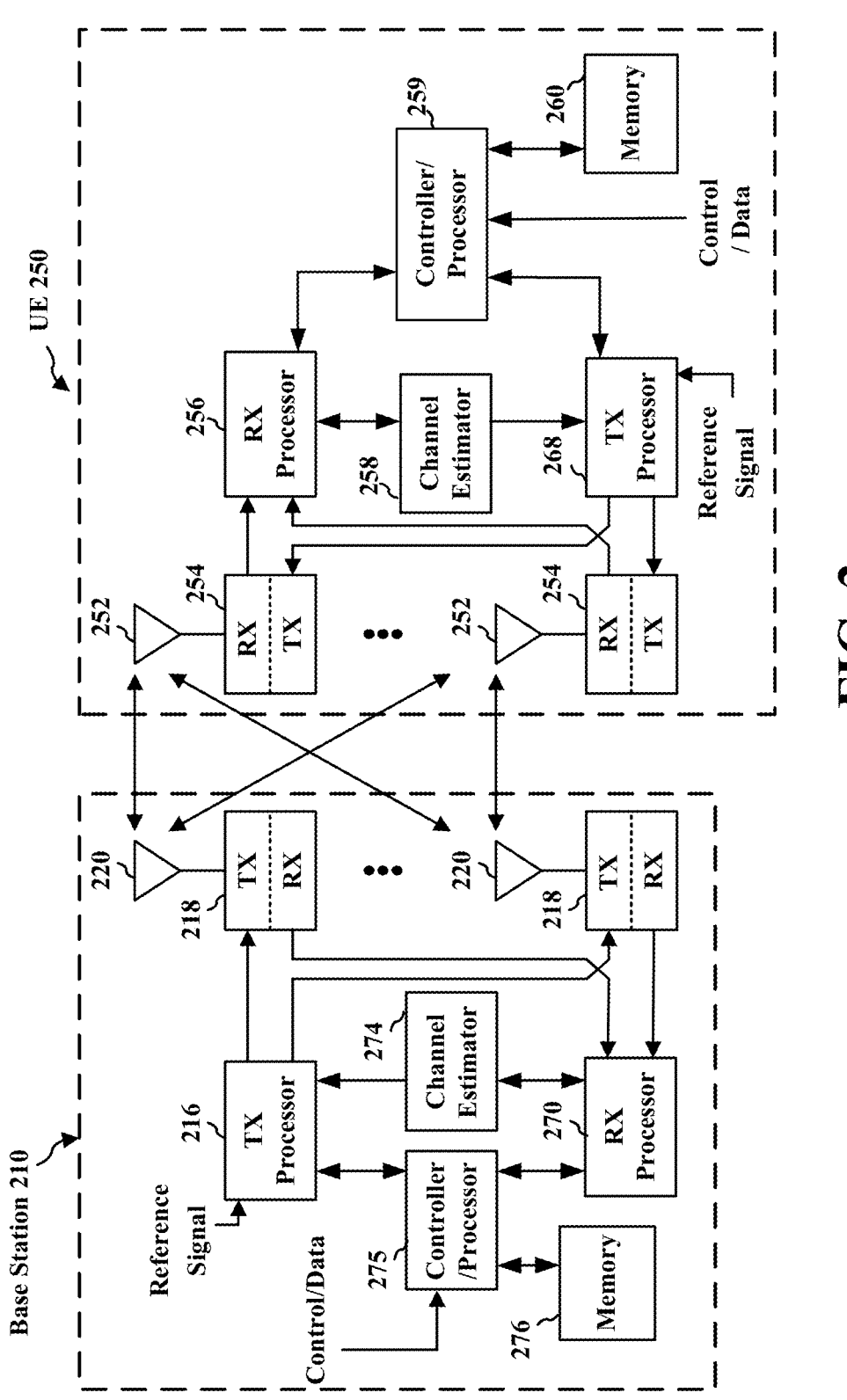
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
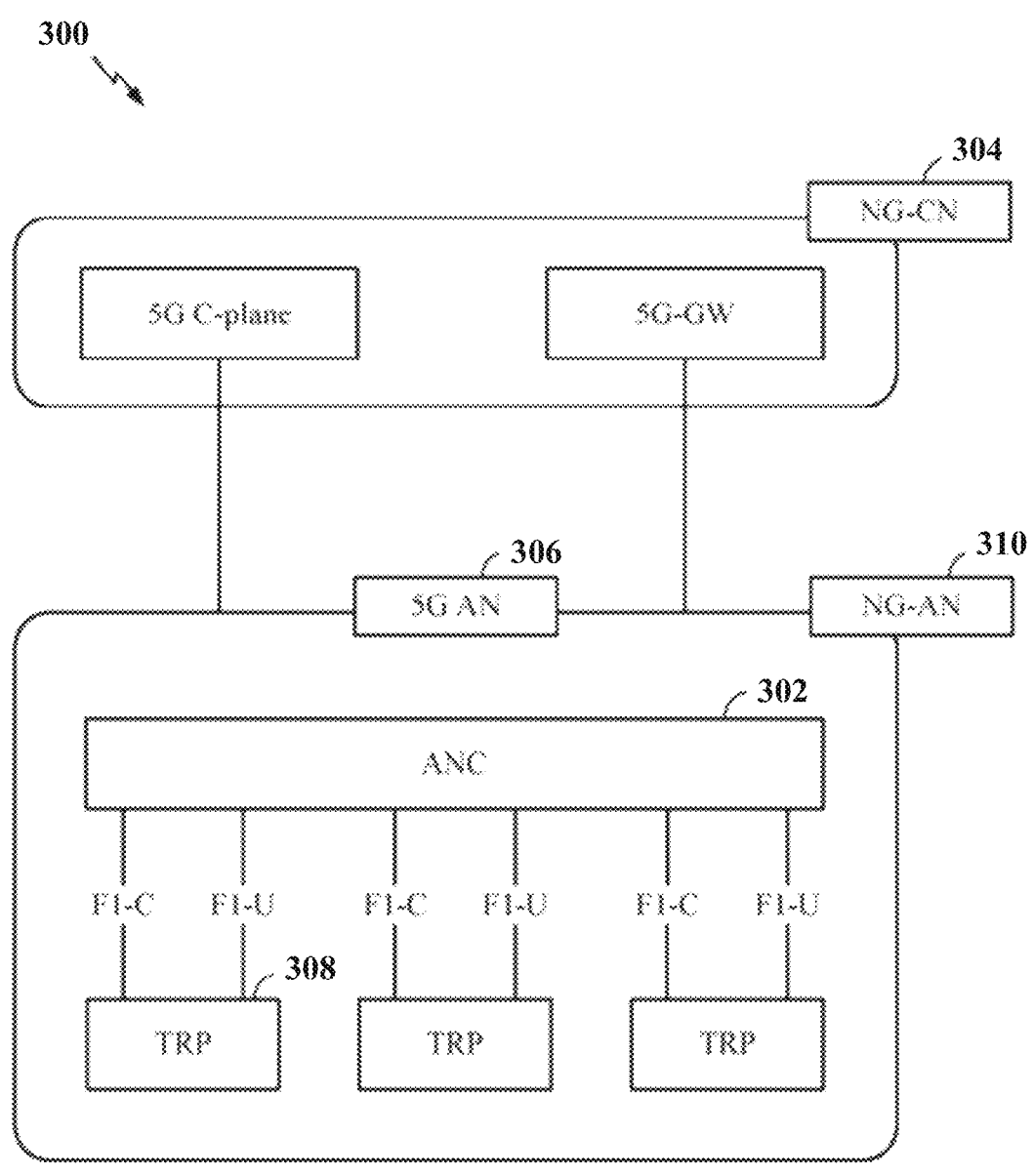
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
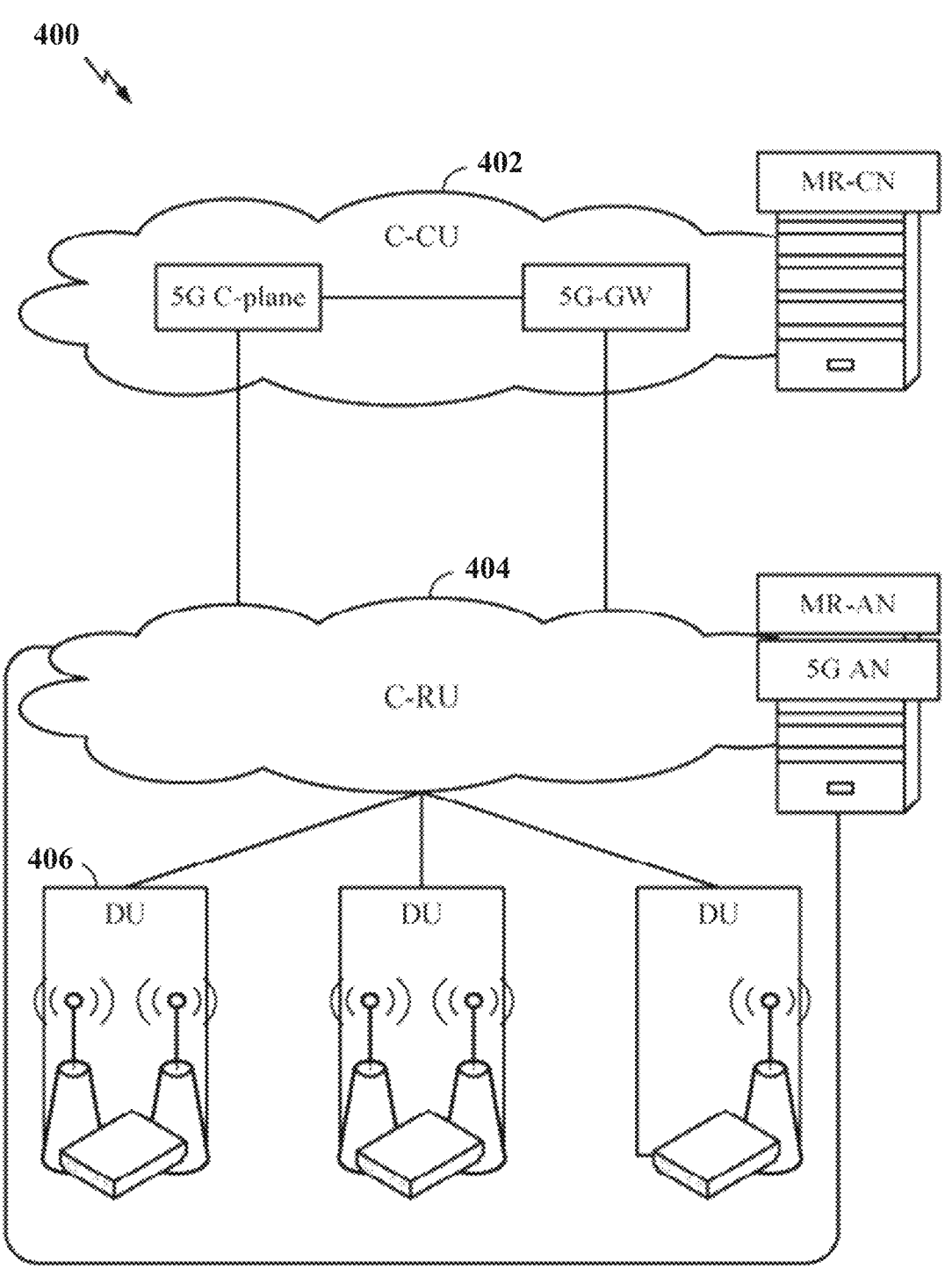
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
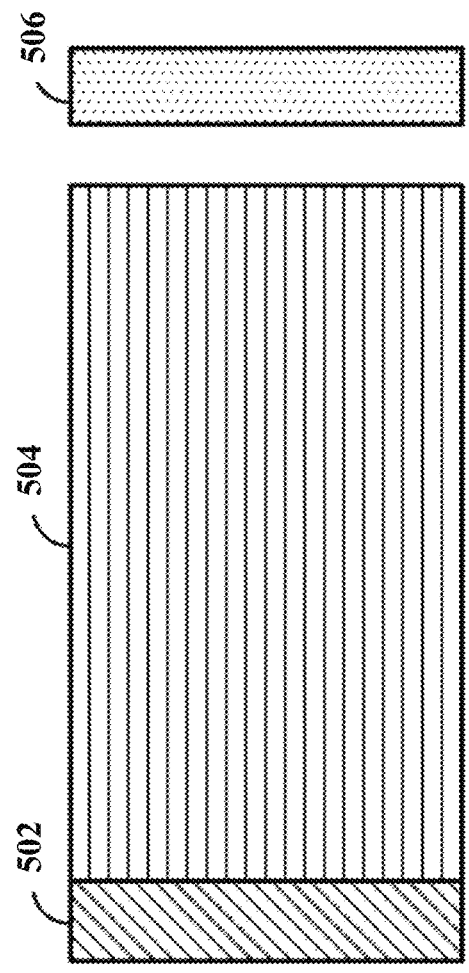
FIG. 5 is a diagram showing an example of a DL-centric slot.
Figure 5:
Figure 5:
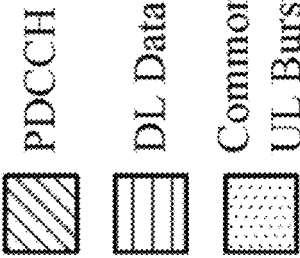

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
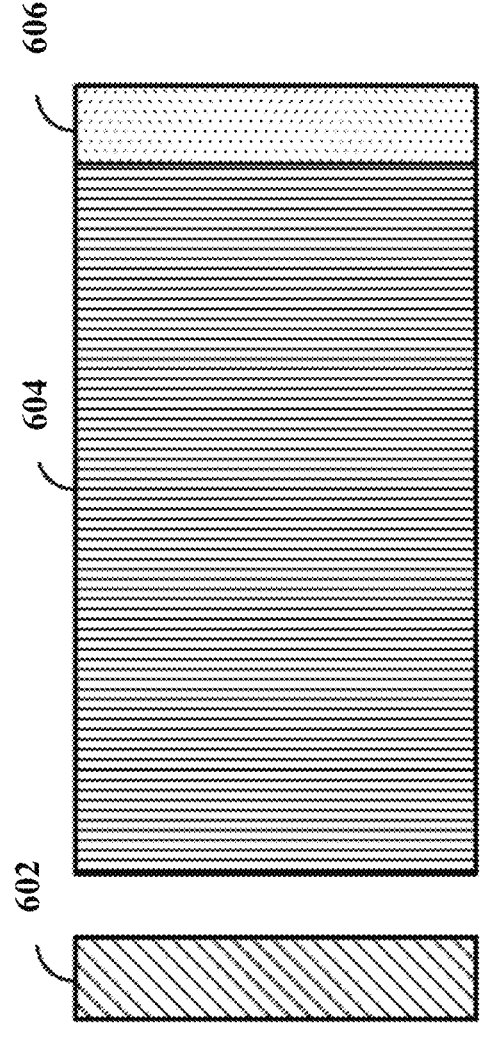
FIG. 6 is a diagram showing an example of an UL-centric slot.
Figure 6:
Figure 6:
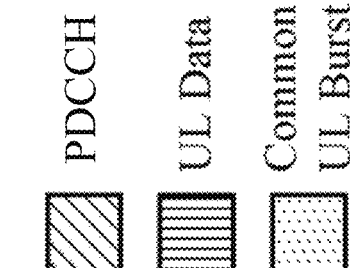

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In certain configurations, the UE may be required to execute certain events, for example, an OS upgrade procedure, silent rest at modem, or binary updates such as modem software updates. In this case, once the UE has downloaded the binary, the time when the UE performs the upgrade is left for the UE implementation. When the UE becomes unavailable to execute such events, it can affect critical operations of an application server if the availability of the UE is not correctly configured during an unavailability period (i.e., a period of time during which the UE is not available) as described in 3GPP Technical Specification (TS) 24.501. Thus, there is a need for coordination between the UE and operator/application function.

Figure 7:
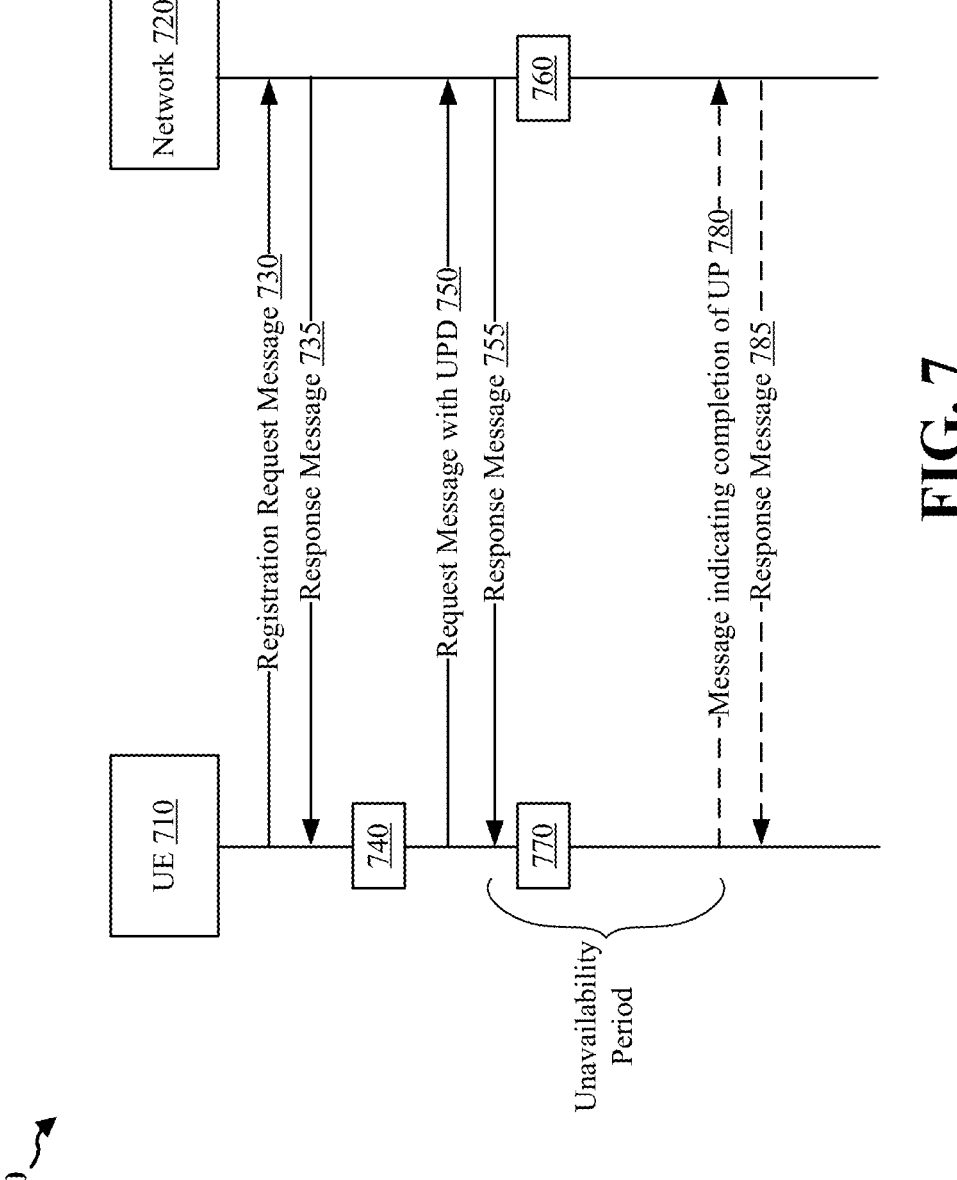
FIG. 7 is a diagram illustrating an example procedure between a UE and a network.

FIG. 7 is a diagram illustrating an example procedure between a UE and a network. Specifically, the UE 710 and the network 720 (e.g., an AMF or a MME) may both support the unavailability period feature. As shown in FIG. 7, when the UE 710 is in a coverage (e.g., within the NR satellite access) of the network 720, the UE 710 sends a registration request 730 to the network 720 to become registered. Upon receiving the registration request from the UE 710, the network 720 sends a response message 735 back to the UE 710 to confirm the receipt of the registration request 730. In this case, the UE 710 enters a registered mode. In certain configurations, the response message 735 includes information of a value for a periodic registration update time, during which the registration state of the UE is considered valid. Upon receiving the response message 735, the UE 710 may set a periodic registration timer (e.g., a T3512 timer) based on the periodic registration update time, such that the UE 710 may perform a periodic registration process at the expiration of the periodic registration timer.

When the UE 710 is in the registered mode, the UE 710 may run a plurality of NAS timers. Specifically, the NAS is a functional layer running and supporting traffic and signaling messages between the UE 710 and the network (i.e., the network 720). The NAS layer is used to manage the establishment of communication sessions and for maintaining continuous communications with the UE 710 as it moves. An example of the NAS timers is the periodic registration timer (e.g., the T3512 timer), and there are other NAS timers that may run on the UE 710 when the UE 710 is in the registered mode.

At operation 740, an event occurs to trigger the UE 710 to enter the unavailability period, such that the UE 710 may be deemed unavailable for a period of time. Specifically, the event triggering the UE 710 to enter the unavailability period may include: (1) UE-specific events, e.g., the UE 710 performing a software update, or power saving events (e.g., deactivating the radio power of the UE 710); and (2) the UE 710 detecting that it is losing satellite access coverage of the network 720, i.e., the UE is due to NR satellite access discontinuous coverage.

Upon being trigger by the event, the UE 710 sends a request message 750 to the network 720 to indicate information of the unavailability period. In certain configurations, the request message 750 may be a mobility registration update (MRU) message or a UE-initiated deregistration message. In one embodiment, the request message 750 may include information related to the unavailability period, such as the indication and type of unavailability, the start of the unavailability period (if known), and an unavailability period duration (UPD) (if known).

At the network 720, upon receiving the request message 750 from the UE 710, the network 720 sends a corresponding response message 755 back to the UE 710 to confirm receipt of the request message 750. At operation 760, the network 720 stores the information related to the unavailability period in the UE context and determines that the UE 710 is not reachable during the UPD. In this case, the network 720 does not page the UE 710 during the UPD.

In certain configurations, the network 720 may set an unavailability period timer based on the information related to the unavailability period in the request message 750. In one embodiment, the unavailability period timer is set based on the information of the start of the unavailability period and the UPD in the request message 750. In an alternative embodiment, if the message 750 does not include the information of the start of the unavailability period, the network 720 may consider implicitly the start of the unavailability period to be the time the network 720 receives the request message 750, and set the unavailability period timer accordingly. In yet another alternative embodiment, if the request message 750 does not include the UPD, the network 720 may determine the UPD based on the type of unavailability and other information available to the network 720, and set the unavailability period timer accordingly.

Further, when the UE 710 sends the request message 750 with the intent to enter the unavailability period and receives the response message 755, there may be some of the NAS timers that keep running on the UE 710. Some of these NAS timers may be stopped in the unavailability period, but the UE 710 may have to keep some of the NAS timers running when the UE 710 enters the unavailability period. Thus, at operation 770, the UE 710 may stop one or more first NAS timers and not stop one or more second NAS timers, such that the second NAS timers keep running in the unavailability period. Specifically, the second NAS timers (i.e., the NAS timers that the UE 710 intends to keep running when entering the unavailability period) include: a periodic registration update timer (e.g., the T3512 timer), a mobility management back-off timer (e.g., the T3346 timer), a service gap timer (e.g., the T3447 timer), a session management back-off timer (e.g., the T3396 timer), Single Network Slice Selection Assistance Information (S-NSSAI) based congestion control timers (e.g., the T3584 and T3585 timers), other back-off timers, a timer protecting the UE from non-integrity protected reject messages (e.g., the T3247 timer), and a periodic attempt timer controlling periodic attempts to perform a public land mobile network (PLMN) search. On the other hand, the first NAS timers (i.e., the NAS timers the UE 710 may stop when entering the unavailability period) include all NAS timers that are running when the unavailability period is activated except for the second NAS timers. Details of the NAS timers will be elaborated later.

The response message 755 sent by the network 720 may include additional information related to the certain UE procedures. For example, as discussed, when the UE 710 performs the registration process by sending the registration request message 730 to the network 720, the network 720 sends back the response message 735 to the UE 710 to include information of a value for a periodic registration update time, such that the UE 710 may set the periodic registration timer (e.g., the T3512 timer) based on the periodic registration update time. In certain configurations, since the UE 710 is now triggered to enter the unavailability period, when the network 720 receives the request message 750 with the information related to the unavailability period, the network 720 may determine an updated value for the periodic registration update time, and include the updated value for the periodic registration update time in the response message 755, such that the UE 710 may update the periodic registration timer based on the updated value of the periodic registration update time in the response message 755. It should be noted that the periodic registration timer (e.g., the T3512 timer) is one of the second NAS timers, i.e., the NAS timers that the UE 710 intends to keep running when the UE 710 enters the unavailability period. Therefore, the UE 710 may update the periodic registration timer based on the response message 755 received from the network 720 without stopping the periodic registration timer. In certain configurations, the updated periodic registration update time may be longer than or equal to the UPD, such that the periodic registration timer (e.g., the T3512 timer) does not expire during the unavailability period. In other words, the UE 710 does not have to perform the periodic registration during the unavailability period. In this case, the UE 710 and the network 720 may match the periodic registration timer to the unavailability period without a conflict therebetween.

In certain configurations, since the network 720 considers the UE 710 to be unreachable during the unavailability period, the network 720 may determine whether the UE 710 requires a further registration procedure when the unavailability period ends. Thus, the network 720 may include the information as to whether the UE 710 requires a further registration procedure when the unavailability period ends in the response message 755, such that the UE 710, upon receiving the response message 755, may determine whether it is required to perform a further registration procedure when the unavailability period ends.

As discussed, the UE 710 may determine whether it is required to perform a further registration procedure when the unavailability period ends based on the information in the response message 755. Optionally, if the response message 755 indicates that there is a need for the UE 710 to perform the further registration procedure, when the unavailability period ends, the UE 710 sends a message 780 to the network 720 to indicate completion of the unavailability period. In certain configurations, the message 780 may be another mobility registration update message for updating the registration status of the UE 710, or may be a registration request message if the UE 710 has previously de-registered with the UE-initiated deregistration message as the request message 750. Upon receiving the message 780, the network 720 sends a response message 785 back to the UE 710 to confirm receipt of the message 780. At operation 760, the network 720 stores the information related to the unavailability period in the UE context and determines that the UE 710 is not reachable during the UPD. On the other hand, if the response message 755 indicates that there is no need for the UE 710 to perform the further registration procedure, the UE 710 may choose not to send the message 780, and there will be no response message 785.

Figure 8:
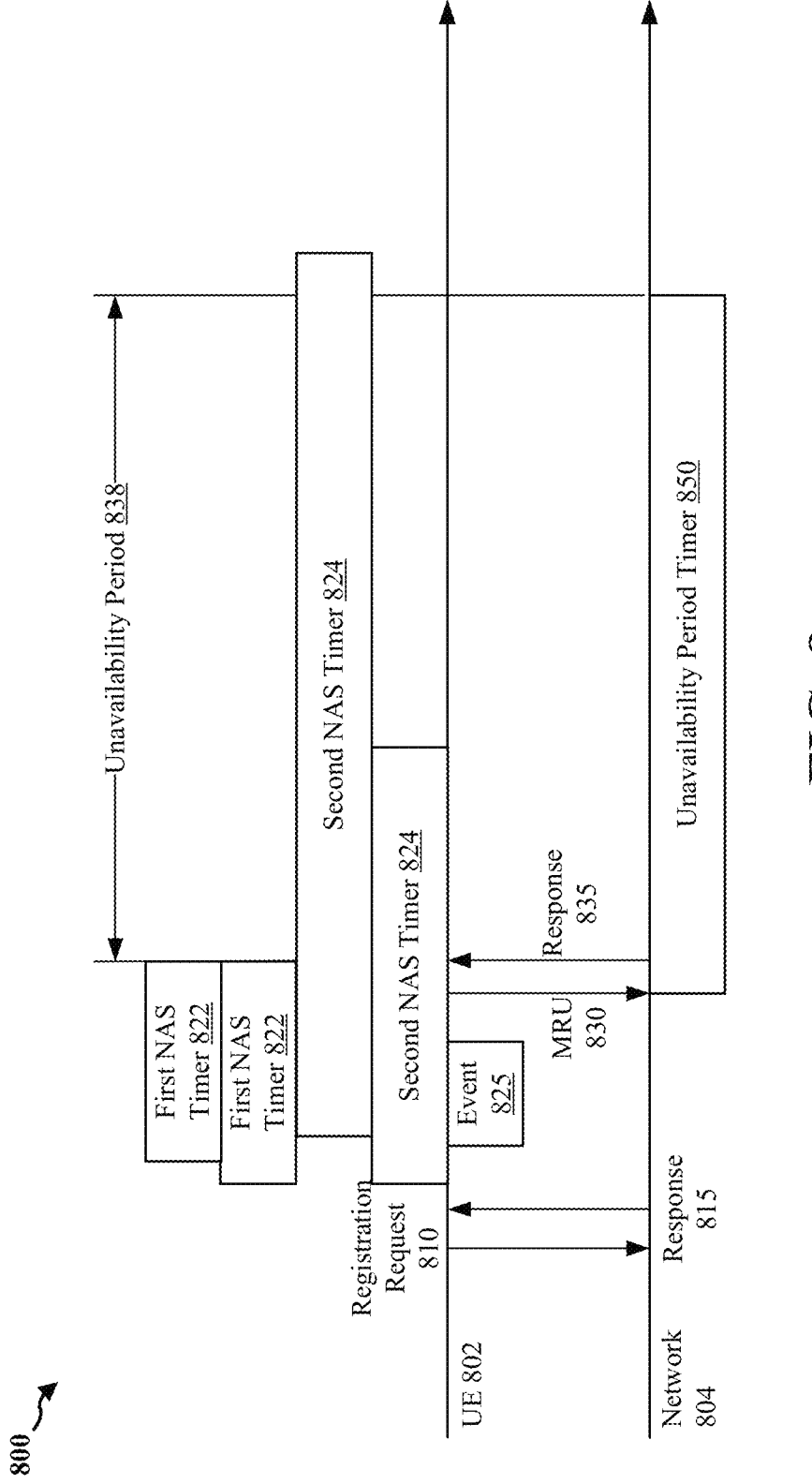
FIG. 8 is a diagram illustrating an example of a UE stopping the first NAS timers and keeping the second NAS timers running when entering an unavailability period duration.

FIG. 8 is a diagram illustrating an example of a UE stopping the first NAS timers and keeping the second NAS timers running when entering an unavailability period duration. Specifically, in the procedure 800, the UE 802 (i.e., the UE 710) may stop all first NAS timers 822 running but keep the second NAS timers 824 running when the UE 802 enters the unavailability period 838.

As shown in FIG. 8, when the UE 802 is within the NR satellite access coverage of the network 804, the UE 802 sends a registration request 810 to the network 804 (i.e., the network 720) to become registered. Upon receiving the registration request from the UE 802, the network 804 sends a response message 815 back to the UE 802 to confirm the receipt of the registration request 810, allowing the UE 802 to enter a registered mode. During the registered mode, the UE 802 may start running a plurality of NAS timers. For example, FIG. 8 shows the UE 802 running two first NAS timers 822 and two second NAS timers 824 concurrently. It should be noted that the NAS timers may be triggered by different events/conditions and start running at different time periods. In certain configurations, it is possible that multiple NAS timers run concurrently on the UE 802.

When the UE 802 detects an event 825 that triggers the UE 802 to enter the unavailability period 838, the UE 802 may send a MRU message 830 to the network 804 to indicate information of the unavailability period 838. Specifically, the MRU message 830 may include information related to the unavailability period, such as the indication and type of unavailability, the start of the unavailability period (if known), and the UPD (if known). It should be noted that the UE 802 sends the MRU message 830 when the NAS timers (including the first NAS timers 822 and the second NAS timers 824) are running. In other words, the UE

802 intends to enter the unavailability period when the first NAS timers 822 and the second NAS timers 824 are running. In this case, the UE 802 sends the MRU 830 with the intent to enter the unavailability period.

At the network 804, upon receiving the MRU message 830, the network 804 sets an unavailability period timer 850 based on the start of the unavailability period and the UPD, and sends a response message 835 back to the UE 802. In this case, the UE 802 receives the response message 835 and confirms that the UE 802 enters the unavailability period 838. By receiving a response message 835, the UE 802 enters the unavailability period 838, and the UE 802 may stop the first NAS timers 822. However, the UE 802 does not stop the second NAS timers 824, allowing the second NAS timers 824 to keep running in the unavailability period 838. The second NAS timers 824 may keep running in the unavailability period 838 until they respectively expire, either during the unavailability period 838 or after the end of the unavailability period 838.

As discussed, the second NAS timers (i.e., the NAS timers that the UE 802 intends to keep running when entering the unavailability period 838) include the periodic registration update timer (e.g., the T3512 timer), the mobility management back-off timer (e.g., the T3346 timer), the service gap timer (e.g., the T3447 timer), the session management back-off timer (e.g., the T3396 timer), the S-NSSAI based congestion control timers (e.g., the T3584 and T3585 timers), other back-off timers, the timer protecting the UE from non-integrity protected reject messages (e.g., the T3247 timer), and the periodic attempt timer controlling periodic attempts to perform the PLMN search. Details of these second NAS timers will be discussed hereinafter in details.

Figure 9:
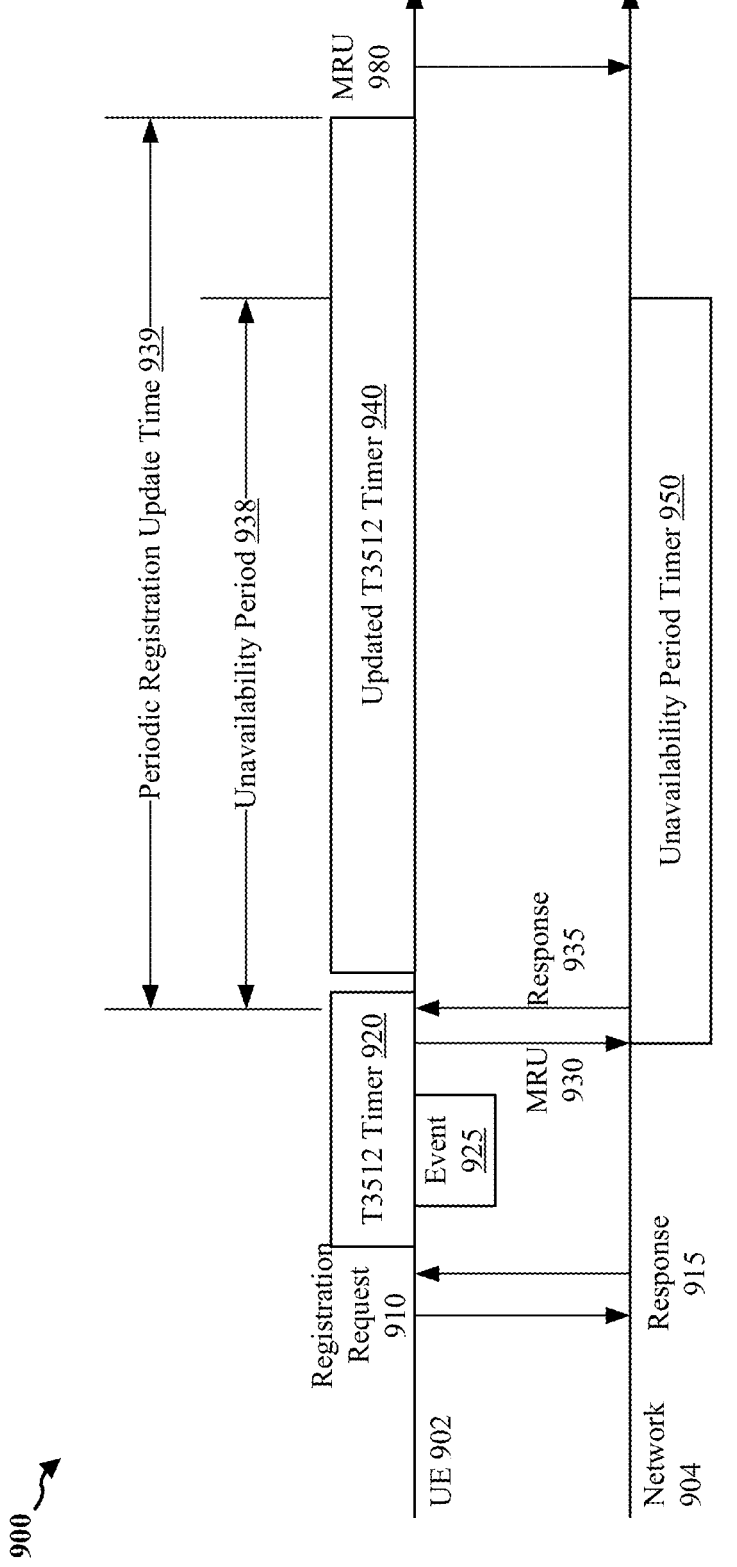
FIG. 9 is a diagram illustrating an example of a UE keeping the periodic registration timer running when entering an unavailability period duration.

FIG. 9 is a diagram illustrating an example of a UE keeping the periodic registration timer running when entering an unavailability period duration. Specifically, the periodic registration update timer (e.g., the T3512 timer) is used to trigger the periodic registration update procedure, which is used over 3GPP access to periodically notify the availability of the UE (i.e., the UE 710) to the network (i.e., the network 720). Specifically, the periodic registration update procedure is controlled in the UE 710 by the T3512 timer (i.e., the periodic registration update timer), and the value of the T3512 timer is sent by the network (i.e., the network 720) to the UE 710 in the registration accept/response message (e.g., the response message 735).

As shown in FIG. 9, when the UE 902 (i.e., the UE 710) is in a coverage (e.g., within the NR satellite access) of the network 904 (i.e., the network 720), the UE 902 sends a registration request 910 to the network 904 to become registered. Upon receiving the registration request 910 from the UE 902, the network 904 sends a response message 915 back to the UE 902 to confirm the receipt of the registration request 910, allowing the UE 902 to enter a registered mode. As discussed, the response message 915 may include information of a value for a periodic registration update time, such that the UE 902 may set a T3512 timer (i.e., the periodic registration timer) 920 based on the periodic registration update time.

When the UE 902 detects an event 925 that triggers the UE 902 to enter the unavailability period 938, the UE 902 sends a MRU message 930 to the network 904 to indicate information of the unavailability period 938. Specifically, the MRU message 930 may include information related to the unavailability period, such as the indication and type of unavailability, the start of the unavailability period (if known), and the UPD (if known). It should be noted that the UE 902 sends the MRU message 930 before the T3512 timer (i.e., the periodic registration timer) 920 expires. In other words, the UE 902 intends to enter the unavailability period when the T3512 timer (i.e., the periodic registration timer) 920 is running.

At the network 904, upon receiving the MRU message 930, the network 904 sets an unavailability period timer 950 based on the start of the unavailability period and the UPD, and sends a response message 935 back to the UE 902. In this case, the response message 935 includes information indicating that the UE 902 does not need to perform a further registration procedure at the end of the unavailability period. Further, the response message 935 includes information of an updated value for the periodic registration update time, such that the UE 902 may update the T3512 timer (i.e., the periodic registration timer) 920 with the updated value of the periodic registration update time 939. At the UE 902, upon receiving the response message 935, the UE 902 enters the unavailability period 938 and updates the periodic registration timer 920 based on the updated value for the periodic registration update time, such that an updated T3512 timer 940 starts running during the unavailability period 938. Further, the UE 902 does not stop the T3512 timer 920, allowing the T3512 timer 920 to keep running at the start of the unavailability period 938. It should be noted that the update of the T3512 timer 920 occurs during the unavailability period 938, and the T3512 timer 920 is not stopped when the UE 902 enters the unavailability period 938.

As shown in FIG. 9, the periodic registration update time 939 (which corresponds to the updated T3512 timer 940) is longer than the unavailability period 938, thus ensuring that the UE 902 does not perform any registration update procedure during the unavailability period 938. In certain configurations, the periodic registration update time 939 may be longer than or equal to the duration of the unavailability period 938.

When the unavailability period 938 ends, the updated T3512 timer 940 is still running, and the UE 902 does not perform any additional registration procedure when the unavailability period 938 ends. However, the network 904 considers the UE 902 to be available when the unavailability period timer 950 expires. Further, the UE 902 waits until the expiration of the updated T3512 timer 940 to send another MRU message 980 to the network 904 to update the UE registration.

Figure 10:
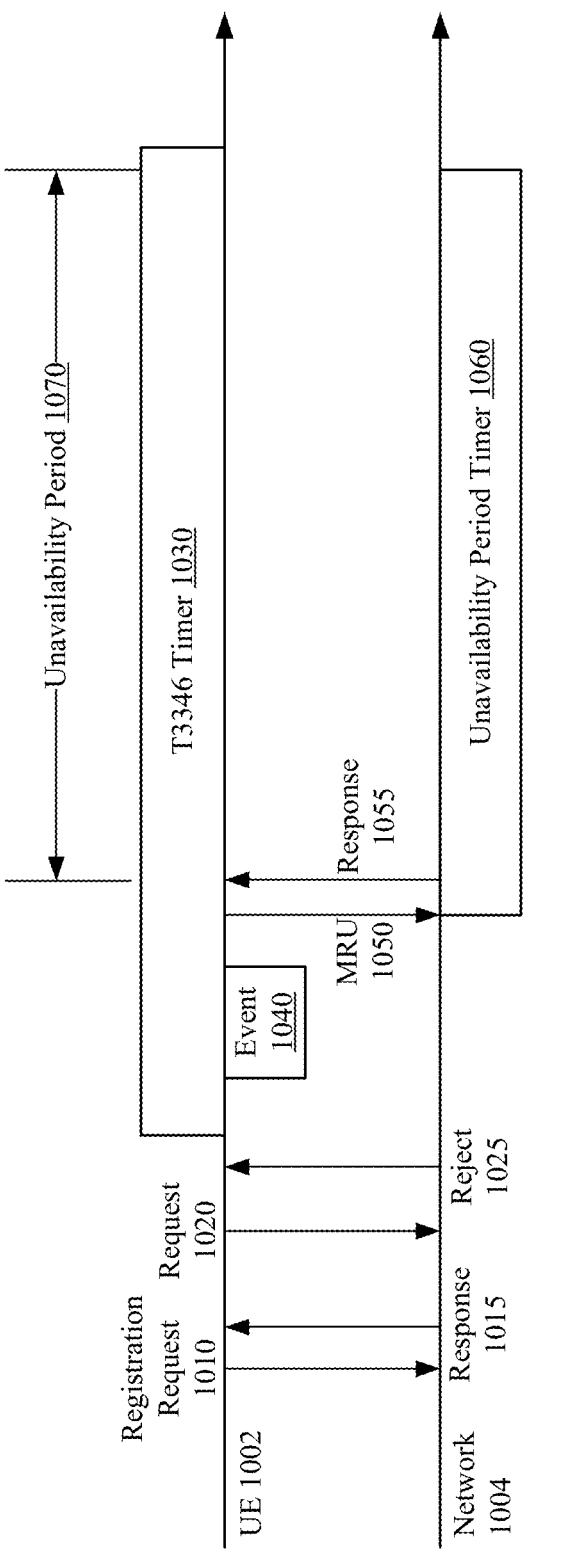
FIG. 10 is a diagram illustrating an example of a UE keeping the mobility management back-off timer running when entering an unavailability period duration.

FIG. 10 is a diagram illustrating an example of a UE keeping the mobility management back-off timer running when entering an unavailability period duration. The mobility management back-off timer (e.g., the T3346 timer) is a back-off timer (e.g., a timer indicating a period of time for waiting to avoid collision and therefore improving the efficiency of the network) used for NAS level mobility management congestion control. Specifically, when the NAS level mobility management congestion control is active, the network (i.e., the network 720) may include a value for the mobility management back-off timer (i.e., the T3346 timer) in the mobility management reject messages, such as an attach reject message, a tracking area update (TAU) reject message, or a service request reject message. Upon receiving the mobility management reject messages, the UE 710 may start the T3346 timer with the value received in the mobility management reject messages.

As shown in FIG. 10, when the UE 1002 (i.e., the UE 710) is within the NR satellite access coverage of the network 1004 (i.e., the network 720), the UE 1002 sends a registration request 1010 to the network 1004 to become registered. Upon receiving the registration request 1010 from the UE 1002, the network 1004 sends a response message 1015 back to the UE 1002 to confirm the receipt of the registration request 1010, allowing the UE 1002 to enter a registered mode.

Then, the UE 1002 may perform a corresponding procedure (e.g., a TAU procedure in the case where the UE 1002 moves from the 5G network to the 4G network) by sending a request (e.g., a TAU request) 1020 to the network 1004. Upon receiving the request 1020, the network 1004 may determine whether the request 1020 is acceptable or not. If the network 1004 determines to reject the request, the network 1004 sends a corresponding reject message (e.g., a TAU reject message) 1025 back to the UE 1002. The reject message 1025 may include a value for the mobility management back-off timer (i.e., the T3346 timer), and the UE 1002, upon receiving the reject message 1025, may set a T3346 timer (i.e., the mobility management back-off timer) 1030 based on the value in the reject message 1025.

When the UE 1002 detects an event 1040 that triggers the UE 1002 to enter the unavailability period 1070, the UE 1002 sends a MRU message 1050 to the network 1004 to indicate information of the unavailability period 1070. Specifically, the MRU message 1050 may include information related to the unavailability period, such as the indication and type of unavailability, the start of the unavailability period (if known), and the UPD (if known). It should be noted that the UE 1002 sends the MRU message 1050 before the T3346 timer (i.e., the mobility management back-off timer) 1030 expires. In other words, the UE 1002 intends to enter the unavailability period 1070 when the T3346 timer (i.e., the mobility management back-off timer) 1030 is running.

At the network 1004, upon receiving the MRU message 1050, the network 1004 sets an unavailability period timer 1060 based on the start of the unavailability period and the UPD, and sends a response message 1055 back to the UE 1002. At the UE 1002, upon receiving the response message 1055, the UE 1002 enters the unavailability period 1070. In this case, the UE 1002 does not stop the T3346 timer 1030, allowing the T3346 timer 1030 to keep running in the unavailability period 1070. As shown in FIG. 10, the T3346 timer 1030 does not expire until the end of the unavailability period 1070. In other words, the value for the mobility management back-off timer is longer than the unavailability period 1070, allowing the T3346 timer 1030 to keep running throughout the unavailability period 1070. In certain configurations, the T3346 timer 1030 may expire during the unavailability period 1070 if the value for the mobility management back-off timer is shorter than the unavailability period 1070.

Figure 11:
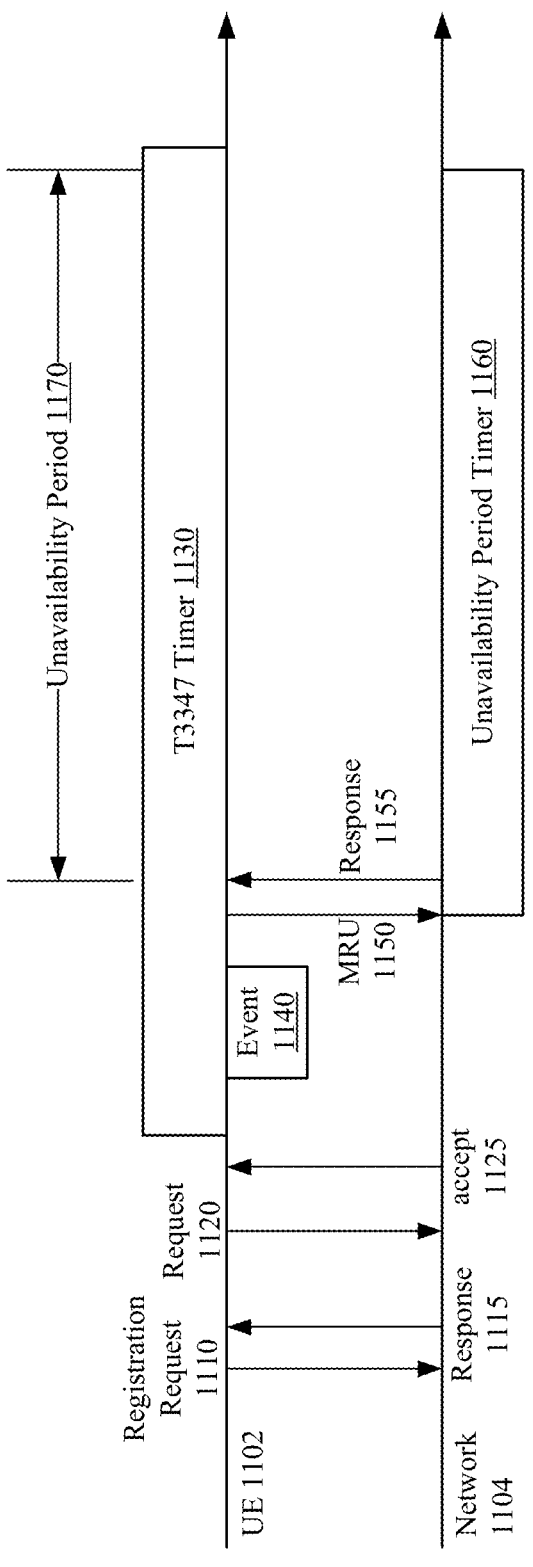
FIG. 11 is a diagram illustrating an example of a UE keeping the service gap timer running when entering an unavailability period duration.

FIG. 11 is a diagram illustrating an example of a UE keeping the service gap timer running when entering an unavailability period duration. The service gap timer (e.g., the T3447 timer) is a timer for service gap control (SGC). Specifically, the network (i.e., the network 720) may control the frequency the UE 710 may transit from the EMM-IDLE mode to the EMM-CONNECTED mode when being connected to EPC or from the 5GMM-IDLE mode to the 5GMM-CONNECTED mode when being connected to 5GC via the SGC as specified in the 3GPP TS 23.401. If the network supports the SGC feature and the service gap time value is available in the EMM context or the 5GMM context of the UE, the MME or the AMF may consider the SGC as being active for the UE 710. In this case, the MME may include a value of the service gap timer (i.e., the T3447 timer) in the ATTACH accept message and/or the TAU accept message if the UE 710 is connected to EPC, or the AMF may include a value of the service gap timer (i.e., the T3447 timer) in the registration accept message if the UE 710 is connected to 5GC. Upon receiving the accept message, the UE 710 may store the service gap time value and set the T3447 timer corresponding.

As shown in FIG. 11, when the UE 1102 (i.e., the UE 710) is within the NR satellite access coverage of the network 1104 (i.e., the network 720), the UE 1102 sends a registration request 1110 to the network 1104 to become registered. Upon receiving the registration request 1110 from the UE 1102, the network 1104 sends a response message 1115 back to the UE 1102 to confirm the receipt of the registration request 1110, allowing the UE 1102 to enter a registered mode.

Then, the UE 1102 may perform a corresponding procedure (e.g., a registration procedure) by sending a request (e.g., a registration request) 1120 to the network 1104. Upon receiving the request 1120, the network 1104 may determine whether the request 1120 is acceptable or not. If the network 1104 determines to accept the request 1120, the network 1104 sends an accept message (e.g., a registration accept message) 1125 back to the UE 1102. The accept message 1125 may include a value for the service gap timer (i.e., the T3347 timer), and the UE 1102, upon receiving the accept message 1125, may set a T3347 timer (i.e., the service gap timer) 1130 based on the value in the accept message 1125.

When the UE 1102 detects an event 1140 that triggers the UE 1102 to enter the unavailability period 1170, the UE 1102 sends a MRU message 1150 to the network 1104 to indicate information of the unavailability period 1170. Specifically, the MRU message 1150 may include information related to the unavailability period, such as the indication and type of unavailability, the start of the unavailability period (if known), and the UPD (if known). It should be noted that the UE 1102 sends the MRU message 1150 before the T3347 timer (i.e., the service gap timer) 1130 expires. In other words, the UE 1102 intends to enter the unavailability period 1170 when the T3347 timer (i.e., the service gap timer) 1130 is running.

At the network 1104, upon receiving the MRU message 1150, the network 1104 sets an unavailability period timer 1160 based on the start of the unavailability period and the UPD, and sends a response message 1155 back to the UE 1102. At the UE 1102, upon receiving the response message 1155, the UE 1102 enters the unavailability period 1170. In this case, the UE 1102 does not stop the T3347 timer 1130, allowing the T3347 timer 1130 to keep running in the unavailability period 1170. As shown in FIG. 11, the T3347 timer 1130 does not expire until the end of the unavailability period 1170. In other words, the value for the service gap timer is longer than the unavailability period 1170, allowing the T3347 timer 1130 to keep running throughout the unavailability period 1170. In certain configurations, the T3347 timer 1130 may expire during the unavailability period 1170 if the value for the service gap timer is shorter than the unavailability period 1170.

The timer protecting the UE from non-integrity protected reject messages (e.g., the T3247 timer) is a timer (which is not specifically provided with a name in the 3GPP specification) that starts if the UE 710 receives a reject message without integrity protection. Specifically, if a mobile station (MS) or a UE (i.e., the UE 710) performs a location update (LU) and correspondingly receives a location updating reject message without integrity protection with MM cause value #2, #3, #6, #11, #12, #13 or #15 before the network has activated the integrity protection for the circuit switching (CS) domain, the MS/UE shall start the T3247 timer with a random value uniformly drawn from the range between 30 minutes and 60 minutes. Similarly, also in EPC and 5GC, e.g., if the UE is connected to 5GC receives a REGISTRATION REJECT or SERVICE REJECT message without integrity protection with 5GMM cause value #3, #6, #7, #11, #12, #13, #15, #27, #31, #62, #72, #73 or #80 before the network has established secure exchange of NAS messages for the NAS signalling connection, the UE shall start timer T3247 with a random value uniformly drawn from the range between 30 minutes and 60 minutes. The procedure of the UE keeping the T3247 timer running when entering an unavailability period duration is similar to the procedure 1000 as shown in FIG. 10, and is thus not further elaborated.

The session management back-off timer (e.g., the T3396 timer) is a back-off timer for APN or DNN based congestion control, which is specified in the 3GPP TS 24.008, 24.301 and 24.501. Specifically, the MS may start the T3396 timer with the value provided in the back-off timer value IE and not send another ACTIVATE PDP CONTEXT REQUEST without an APN and with request type different from "emergency", or another ACTIVATE SECONDARY PDP CONTEXT REQUEST or MODIFY PDP CONTEXT REQUEST message with exception of those identified in the subclause 6.1.3.3, for a non-emergency PDN connection established without an APN sent by the MS, until the T3396 timer expires or the T3396 timer is stopped. The MS does not stop the T3396 timer upon a PLMN change or an inter-system change. The network may detect and start performing DNN based congestion control when one or more DNN congestion criteria as specified in 3GPP TS 23.501 are met. If the UE does not provide a DNN for a non-emergency PDU session, then the network uses the selected DNN. In the UE, 5GS session management timers (i.e., the T3396 timer) for DNN based congestion control are started and stopped on a per DNN basis except for an LADN DNN in case of PLMN. For an LADN DNN, 5GS session management timers T3396 for DNN based congestion control is applied to the registered PLMN and its equivalent PLMNs. In case of SNPN, if the UE does not support access to an SNPN using credentials from a credentials holder, in the UE, 5GS session management timers (i.e., the T3396 timer) for DNN based congestion control are started and stopped. The procedure of the UE keeping the T3396 timer running when entering an unavailability period duration is similar to the procedure 1000 as shown in FIG. 10 or the procedure 1100 as shown in FIG. 11, and is thus not further elaborated.

The S-NSSAI based congestion control timers (e.g., the T3584 and T3585 timers) are back-off timers used for S-NSSAI based congestion control. Specifically, the AMF may detect and start performing S-NSSAI based congestion control when one or more S-NSSAI congestion criteria as specified in the 3GPP TS 23.501 are met. Usually in 3GPP specifications, S-NSSAI is a synonym to network slice. The other back-off timers are timers similar to the T3584 and T3585 timer that are used for 3GPP TS 24.008. The procedure of the UE keeping the T3584 and T3585 timers and other back-off timers running when entering an unavailability period duration is similar to the procedure 1000 as shown in FIG. 10 or the procedure 1100 as shown in FIG. 11, and is thus not further elaborated.

Figure 12:
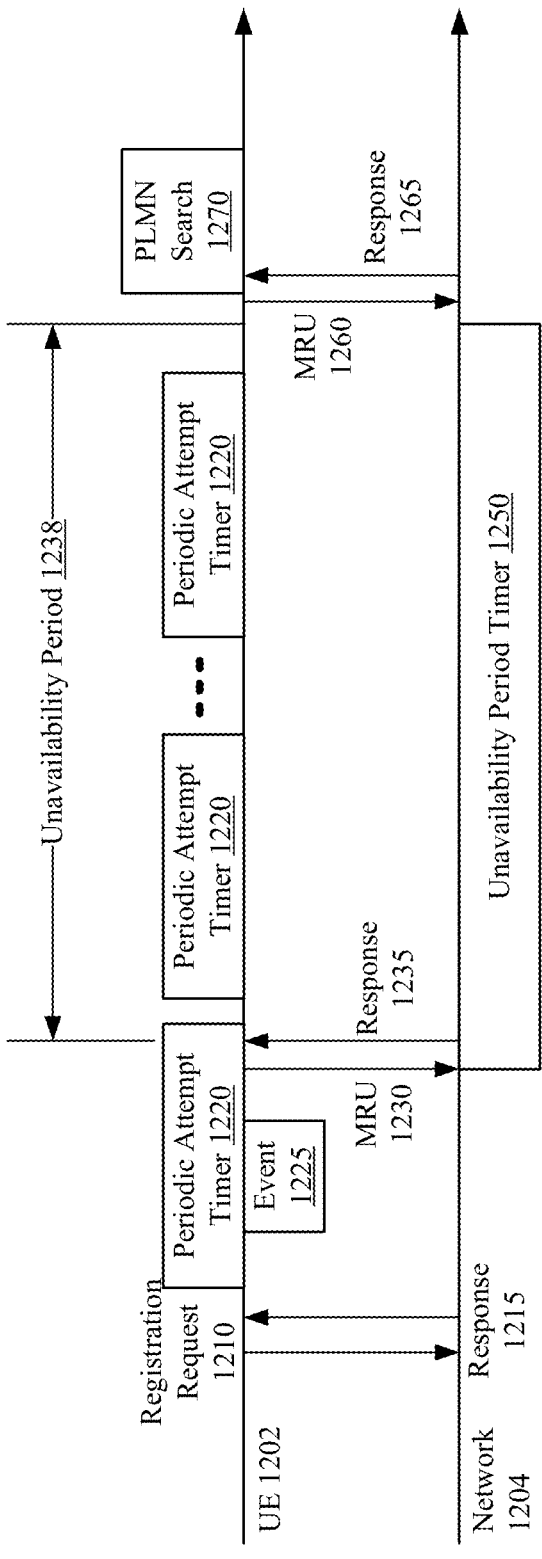
FIG. 12 is a diagram illustrating an example of a UE keeping the periodic attempt timer running when entering an unavailability period duration.

FIG. 12 is a diagram illustrating an example of a UE keeping the periodic attempt timer running when entering an unavailability period duration. The periodic attempt timer is used to trigger PLMN search. Specifically, the periodic attempt timer is set with a value of the pre-configured periodic attempt time, and is "periodic" such that when a current periodic attempt timer expires, the UE 710 may restart a new periodic attempt timer with the value of the pre-configured periodic attempt time. In certain configurations, when the UE 710 enters the unavailability period, the UE 710 may postpone the PLMN search, but does not stop the periodic attempt timer. Examples of the PLMN search may include, without being limited to, performing periodic scan or attempting to access a home PLMN (HPLMN) or an equivalent PLMN (EHPLMN) or other higher priority PLMN.

Generally, when the UE 710 is not in the availability period, the expiration of the periodic attempt timer indicates a trigger to the UE 710 with an attempt to perform the PLMN search, e.g., performing periodic scan or attempting to access the HPLMN or the EHPLMN or other higher priority PLMN. During the unavailability period, the UE 710 may postpone the attempt (or multiple attempts) to perform the PLMN search since the unavailability period is activated. Specifically, as discussed, one of the events that may trigger the unavailability period may be for power-saving purposes, and the UE 710 may save power by postponing the attempt to perform the PLMN search during the unavailability period. Thus, the UE 710 may check the UE availability status (e.g., whether the UE 710 is flagged to be in the unavailability period, or whether an unavailability period timer is still running) when the periodic attempt timer expires, thus determining whether the expiration of the periodic attempt timer is during the unavailability period. When the periodic attempt timer expires during the unavailability period, the expiration of the periodic attempt timer does not trigger the UE 710 to perform the PLMN search. Thus, when the periodic attempt timer expires during the unavailability period, the UE 710 does not perform the PLMN search, e.g., not attempting to perform periodic scan or attempting to access the HPLMN or the EHPLMN or other higher priority PLMN during the unavailability period. Instead, the UE 710 waits until the end of the unavailability period to perform the postponed attempt for the PLMN search. In other words, when the periodic attempt timer expires during the unavailability period, the UE 710 attempts to perform periodic scan or attempts to access the HPLMN or the EHPLMN or other higher priority PLMN only after the unavailability period ends.

In certain configurations, the unavailability period may end at the intended UPD. However, it is also possible that the unavailability period may end earlier than the intended UPD, e.g., when the triggering event ends prematurely due to the event being delayed or canceled.

As shown in FIG. 12, in the procedure 1200, the UE 1202 (i.e., the UE 710) utilizes a MRU message to indicate the unavailability period to the network 1204 (i.e., the network 720), and the network 1204 acknowledges the MRU message by indicating that the UE 1202 does not need to perform a further registration process at the end of the unavailability period.

As shown in FIG. 12, in the procedure 1200, when the UE 1202 (i.e., the UE 710) is within the NR satellite access coverage of the network 1204 (i.e., the network 720), the UE 1202 sends a registration request 1210 to the network 1204 to become registered. Upon receiving the registration request from the UE 1202, the network 1204 sends a response message 1215 back to the UE 1202 to confirm the receipt of the registration request 1210, allowing the UE 1202 to enter a registered mode. In certain configurations, the response message 1215 may include a value of the periodic attempt timer 1220, such that the UE 1202 starts running the periodic attempt timer 1220.

When the UE 1202 detects an event 1225 that triggers the UE 1202 to enter the unavailability period 1238, the UE 1202 sends a MRU message 1230 to the network 1204 to indicate information of the unavailability period 1238. Specifically, the MRU message 1230 may include information related to the unavailability period 1238, such as the indication and type of unavailability, the start of the unavailability period (if known), and the UPD (if known). It should be noted that the UE 1202 sends the MRU message 1230 before the periodic attempt timer 1220 expires. In other words, the UE 1202 intends to enter the unavailability period 1238 when the periodic attempt timer 1220 is running.

At the network 1204, upon receiving the MRU message 1230, the network 1204 sets an unavailability period timer 1250 based on the start of the unavailability period and the UPD, and sends a response message 1235 back to the UE 1202. In this case, the response message 1235 includes information indicating that the UE 1202 is required to perform a further registration procedure at the end of the unavailability period 1238. At the UE 1202, upon receiving the response message 1235, the UE 1202 enters the unavailability period 1238. In this case, the UE 1202 does not stop the periodic attempt timer 1220, allowing the periodic attempt timer 1220 to keep running at the start of the unavailability period 1238. In certain cases, it is possible that the response message 1235 may include information indicating that the UE 1202 is not required to perform the further registration procedure at the end of the unavailability period 1238. During the unavailability period 1238, the periodic attempt timer 1220 may keep running on the UE 1202. It is possible that the periodic attempt timer 1220 may expire for multiple times during the unavailability period 1238, based on the value of the unavailability period 1238 and the value of the periodic attempt timer 1220. At the expiration of each periodic attempt timer 1220, the UE 1202 postpones the PLMN search (e.g., not performing the PLMN search).

When the unavailability period 1238 ends, based on the instruction of the response message 1235 (that the UE 1202 is required to perform a further registration procedure at the end of the unavailability period 1238), the UE 1202 sends another MRU message 1260 to the network 1204 to perform the required registration update procedure. Specifically, the MRU message 1260 may include information confirming the completion of the unavailability period 1238. At the network 1204, upon receiving the MRU message 1260, the network 1204 sends a corresponding response message 1265 back to the UE 1202, indicating that the network 1204 considers the UE 1202 to be available due to the MRU message 1260, which is received after the unavailability period timer 1250 expires. Further, the UE 1202 performs the postponed PLMN search 1270.

Figure 13:
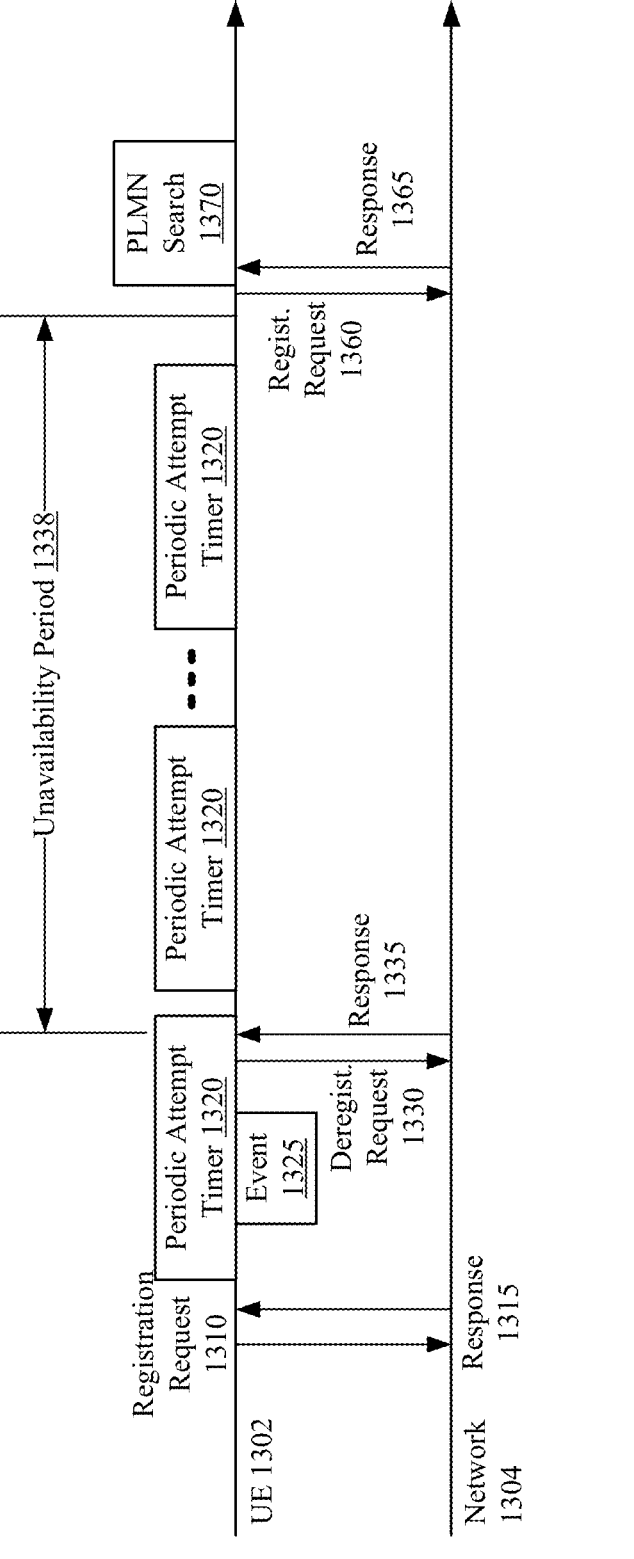
FIG. 13 is a diagram illustrating another example of a UE keeping the periodic attempt timer running when entering an unavailability period duration.

FIG. 13 is a diagram illustrating another example of a UE keeping the periodic attempt timer running when entering an unavailability period duration. Specifically, the procedure 1300 is different from the procedure 1200 in that, in procedure 1200, the UE 1202 uses the MRU message (which is for performing a registration update procedure) to activate the unavailability period, i.e., indicating to the network the information related to the unavailability period (e.g., the indication and type of unavailability, the start of the unavailability period, and the UPD). However, depending on the state of the UE before entering the unavailability period, registration update procedure may be replaced by an initial registration procedure, e.g., a registration request message similar to the registration request message 730. In procedure 1300, the UE 1302 (i.e., the UE 710) utilizes a deregistration request message to indicate the unavailability period to the network 1304 (i.e., the network 720). In this case, since the UE 1302 is deregistered, it is required that the UE 1302 performs a further registration process at the end of the unavailability period to be back to the registered mode.

As shown in FIG. 13, when the UE 1302 is within the NR satellite access coverage of the network 1304, the UE 1302 sends a registration request 1310 to the network 1304 to become registered. Upon receiving the registration request 1310 from the UE 1302, the network 1304 sends a response message 1315 back to the UE 1302 to confirm the receipt of the registration request 1310, allowing the UE 1302 to enter a registered mode. In certain configurations, the response message 1315 may include a value of the periodic attempt timer 1320, such that the UE 1302 starts running the periodic attempt timer 1320.

When the UE 1302 detects an event 1325, e.g., that the UE 1302 moves to a location such that it is losing satellite access coverage of the network 1304, such event 1325 triggers the UE 1302 to enter the unavailability period 1338. Thus, the UE 1302 sends a deregistration request message 1330 to the network 1304 to perform deregistration. Specifically, since the UE 1302 chooses to send the deregistration request message 1330 (and not the MRU message) with the intent to deregister, there is no need for the UE 1302 to include information related to the unavailability period 1338 (e.g., the indication and type of unavailability, the start of the unavailability period and the UPD) in the deregistration request message 1330. At the network 1304, upon receiving the deregistration request message 1330, the network 1304 sends a response message 1335 back to the UE 1302 to acknowledge the deregistration request message 1330. At the UE 1302, upon receiving the response message 1335, the UE 1302 enters the unavailability period 1338.

It should be noted that the UE 1302 sends the MRU message 1330 before the periodic attempt timer 1320 expires. In other words, the UE 1302 intends to enter the unavailability period 1338 when the periodic attempt timer 1320 is running. In this case, the UE 1302 does not stop the periodic attempt timer 1320, allowing the periodic attempt timer 1320 to keep running at the start of the unavailability period 1338. Further, the network 1304 does not set an unavailability period timer, as there is no guarantee that the UE 1302 will become registered again in the future. In this case, the response message 1335 does not need to include information of an updated value for the periodic registration update time or information indicating whether the UE 1302 is required to perform a further registration procedure at the end of the unavailability period 1338.

During the unavailability period 1338, the periodic attempt timer 1320 may keep running on the UE 1302. It is possible that the periodic attempt timer 1320 may expire for multiple times during the unavailability period 1338, based on the value of the unavailability period 1338 and the value of the periodic attempt timer 1320. At the expiration of each periodic attempt timer 1320, the UE 1302 postpones the PLMN search (e.g., not performing the PLMN search).

When the unavailability period 1338 ends, if the UE 1302 moves back to be within the NR satellite access coverage of the network 1304, the UE 1302 may send another registration request 1360 to the network 1304 to become registered again. Upon receiving the registration request 1360 from the UE 1302, the network 1304 sends a response message 1365 back to the UE 1302 to confirm the receipt of the registration request 1360, allowing the UE 1302 to re-enter the registered mode. Further, the UE 1302 performs the PLMN search 1370 after the unavailability period 1338 ends. A time for the PLMN search 1370 may be either soon after the unavailability period 1338 ends or later, e.g., at the next expiry of the periodic attempt timer 1320.

It should be noted that, in the procedure 1300, the UE 1302 moves back to be within the NR satellite access coverage of the network 1304 after the unavailability period 1338 ends. If the UE 1302 moves back to be within the NR satellite access coverage of the network 1304 during the unavailability period 1338, the UE 1302 may consider that the loss of coverage no longer applies. Thus, the UE 1302 may choose to end the unavailability period 1338 earlier than expected by sending the registration request 1360 to the network 1304 to become registered again. In this case, the UE 1302 may then perform the PLMN search due to the earlier termination of the unavailability period 1338.

Further, it is possible that the procedures 900, 1000, 1100 and 1200 may be combined to form a complex procedure. In this case, whenever the UE sends a new request message (e.g., a MRU message, an initial registration request or a deregistration request) triggered by a new event to the network to indicate a new unavailability period, the second NAS timers (e.g., the T3512 timer 920, the T3346 timer 1030, the T3347 timer 1130, the periodic attempt timer 1220, or any other back-off timers or the second NAS timers) that are running when the UE sends this new request message with the intent to enter the unavailability period will keep running without being stopped, while the first NAS timers (i.e., all NAS timers that are running when the UE enters the unavailability period except for the second NAS timers) may be stopped when the UE sends this new request message and receives the corresponding response message to enter the unavailability period.

In certain configurations, the event that triggers the UE to start the unavailability period may include a UE specific event, e.g., the UE performs a software update or for power saving reasons, or may include an event where the UE detects that it is losing satellite access coverage (i.e., the UE enters a location with discontinuous coverage).

Figure 14:
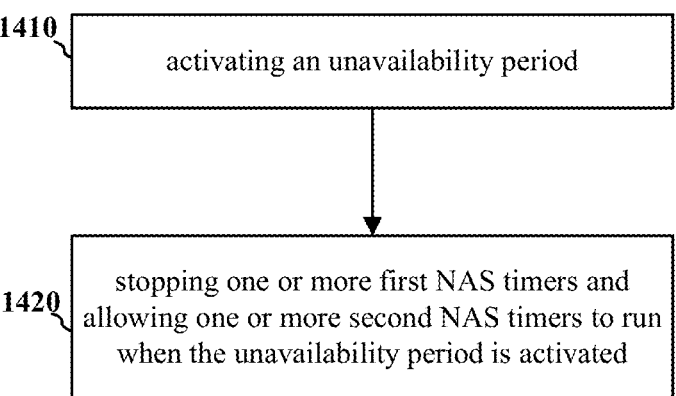
FIG. 14 is a flow chart of a method (process) of wireless communication of a UE.

FIG. 14 is a flow chart of a method (process) of wireless communication of a UE. The method may be performed by a UE, e.g., the UE 710. At operation 1410, the UE activates an unavailability period. At operation 1420, the UE stops one or more first NAS timers and allows one or more second NAS timers to run when the unavailability period is activated. In certain embodiments, the second NAS timers include a periodic registration update timer, a mobility management back-off timer, a service gap timer, a session management back-off timer, S-NSSAI based congestion control timers, back-off timers, a timer protecting the UE from non-integrity protected reject messages, and a periodic attempt timer controlling periodic attempts to perform a PLMN search, and the first NAS timers include all NAS timers running when the unavailability period is activated except for the second NAS timers.

FIG. 15 is a flow chart of a method (process) of wireless communication of a UE. The method may be performed by a UE, e.g., the UE 710. At operation 1510, the UE activates the unavailability period, and the activating the unavailability period is triggered by transmitting, to a network, a request message for initiating a procedure and indicating a duration of the unavailability period. In one embodiment, the procedure is an initial registration procedure, an attach procedure, a tracking area updating procedure or a mobility registration update procedure. In another embodiment, the procedure is a UE-initiated deregistration procedure or a UE-initiated detach procedure. In certain embodiments, the unavailability period is activated by successful completion of the procedure. At operation 1520, the UE receives, from the network, a response message indicating whether the UE is required to perform registration when the unavailability period ends. In certain embodiments, the response message further indicates a periodic registration update time, and the periodic registration update time is longer than or equal to the duration of the unavailability period. At operation 1530, in response to the response message indicating that the UE is required to perform registration when the unavailability period ends, the UE transmits, to the network, a registration request message when the unavailability period ends.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

activating an unavailability period; and stopping one or more first non-access stratum (NAS) timers and allowing one or more second NAS timers to run when the unavailability period is activated, wherein the second NAS timers include:

a periodic registration update timer;

a mobility management back-off timer;

a service gap timer;

a session management back-off timer;

Single Network Slice Selection Assistance Information (S-NSSAI) based congestion control timers;

back-off timers;

a timer protecting the UE from non-integrity protected reject messages; and a periodic attempt timer controlling periodic attempts to perform a public land mobile network (PLMN) search.

2. The method of claim 1, wherein the activating the unavailability period is triggered by:

transmitting, to a network, a request message for initiating a procedure and indicating the unavailability period.

3. The method of claim 2, wherein the procedure is an initial registration procedure, an attach procedure, a tracking area updating procedure or a mobility registration update procedure.

4. The method of claim 2, wherein the procedure is a UE-initiated deregistration procedure or a UE-initiated detach procedure.

5. The method of claim 2, wherein the unavailability period is activated by successful completion of the procedure.

6. The method of claim 2, further comprising:

receiving, from the network, a response message indicating whether the UE is required to perform registration when the unavailability period ends; and in response to the response message indicating that the UE is required to perform registration when the unavailability period ends, transmitting, to the network, a registration request message when the unavailability period ends.

7. The method of claim 6, wherein the response message further indicates a periodic registration update time, and the periodic registration update time is longer than or equal to the duration of the unavailability period.

8. The method of claim 1, wherein the first NAS timers include all NAS timers running when the unavailability period is activated except for the second NAS timers.

9. An apparatus for wireless communication, the apparatus being a user equipment (UE), comprising:

a memory; and at least one processor coupled to the memory, the processor being configured to:

activate an unavailability period; and stop one or more first non-access stratum (NAS) timers and allow one or more second NAS timers to run when the unavailability period is activated, wherein the second NAS timers include:

a periodic registration update timer;

a mobility management back-off timer;

a service gap timer;

a session management back-off timer;

Single Network Slice Selection Assistance Information (S-NSSAI) based congestion control timers;

back-off timers;

a timer protecting the UE from non-integrity protected reject messages; and a periodic attempt timer controlling periodic attempts to perform a public land mobile network (PLMN) search.

10. The apparatus of claim 9, wherein the activating the unavailability period is triggered by:

transmitting, to a network, a request message for initiating a procedure and indicating the unavailability period.

11. The apparatus of claim 10, wherein the procedure is an initial registration procedure, an attach procedure, a tracking area updating procedure or a mobility registration update procedure.

12. The apparatus of claim 10, wherein the procedure is a UE-initiated deregistration procedure or a UE-initiated detach procedure.

13. The apparatus of claim 10, wherein the unavailability period is activated by successful completion of the procedure.

14. The apparatus of claim 10, wherein the processor is further configured to:

receive, from the network, a response message indicating whether the UE is required to perform registration when the unavailability period ends; and in response to the response message indicating that the UE is required to perform registration when the unavailability period ends, transmit, to the network, a registration request message when the unavailability period ends.

15. The apparatus of claim 14, wherein the response message further indicates a periodic registration update time, and the periodic registration update time is longer than or equal to the duration of the unavailability period.

16. The apparatus of claim 9, wherein the first NAS timers include all NAS timers running when the unavailability period is activated except for the second NAS timers.

17. A non-transitory computer-readable medium storing computer executable code for performing wireless communication of a user equipment (UE), comprising code to:

activate an unavailability period; and stop one or more first non-access stratum (NAS) timers and allow one or more second NAS timers to run when the unavailability period is activated, wherein the second NAS timers include:

a periodic registration update timer;

a mobility management back-off timer;

a service gap timer;

a session management back-off timer;

Single Network Slice Selection Assistance Information (S-NSSAI) based congestion control timers;

back-off timers;

a timer protecting the UE from non-integrity protected reject messages; and a periodic attempt timer controlling periodic attempts to perform a public land mobile network (PLMN) search.

18. The non-transitory computer-readable medium of claim 17, wherein the unavailability period is activated by:

transmitting, to a network, a request message for performing a procedure indicating the unavailability period.

* * * * *